United States Patent
Ostrovsky et al.

(10) Patent No.: US 6,779,771 B2
(45) Date of Patent: Aug. 24, 2004

(54) DUAL EXTRUSION SNAP CLOSED CEILING SIGN HANGER

(76) Inventors: John Ostrovsky, 47, Houseman Crescent, Richmond Hill, Ontario (CA), L4C 7R9; Geoff Borg, 41, Marbrook Lane, Suite 909, Toronto, Ontario (CA), M9V 5E6

(*) Notice: Subject to any disclaimer, the term of this patent is extended or adjusted under 35 U.S.C. 154(b) by 0 days.

(21) Appl. No.: 10/446,388

(22) Filed: May 28, 2003

(65) Prior Publication Data

US 2003/0230690 A1 Dec. 18, 2003

Related U.S. Application Data

(63) Continuation of application No. 09/840,572, filed on Apr. 23, 2001, now Pat. No. 6,605,928, and a continuation of application No. 09/319,390, filed as application No. PCT/US97/22405 on Dec. 3, 1997, now abandoned.
(60) Provisional application No. 60/032,149, filed on Dec. 3, 1996.

(51) Int. Cl.[7] .................................................. A47G 1/16
(52) U.S. Cl. ............................... 248/316.7; 248/316.8; 248/489; 24/67.1; 24/67.3; 40/658; 40/647
(58) Field of Search ........................ 248/316.7, 316.8, 248/489; 24/67.1, 67.3, 67.5, 67.9; 40/658, 647, 649

(56) References Cited

U.S. PATENT DOCUMENTS

| | | | | |
|---|---|---|---|---|
| D235,127 S | * | 5/1975 | Grant | D8/373 |
| 4,629,075 A | * | 12/1986 | Hutten | 211/89.01 |
| 5,384,935 A | * | 1/1995 | Maier-Hunke et al. | 24/67 R |
| 5,584,461 A | * | 12/1996 | Pynenburg | 248/475.1 |
| 5,718,402 A | * | 2/1998 | Hoffman et al. | 248/205.3 |
| 5,863,019 A | * | 1/1999 | Rose et al. | 248/205.3 |
| 5,899,011 A | * | 5/1999 | Brinkman | 40/661.03 |
| 6,018,850 A | * | 2/2000 | Lorber | 24/67.9 |
| 6,450,471 B1 | * | 9/2002 | Wear | 248/489 |
| 6,467,742 B1 | * | 10/2002 | Pitcher | 248/205.3 |
| 6,546,658 B2 | * | 4/2003 | Pitcher et al. | 40/658 |
| 6,637,716 B2 | * | 10/2003 | Wear | 248/489 |

* cited by examiner

*Primary Examiner*—Leslie A. Braun
*Assistant Examiner*—Steven Marsh
(74) *Attorney, Agent, or Firm*—Donald W. Meeker

(57) ABSTRACT

A dual extrusion hinged sign hanger hangs from the ceiling and holds signs, banners, posters, and any other sheet type of display material. Display material can be easily changed within a smooth non-damaging holder portion which opens for free non-friction insertion of the display material. The closure has flexible tabs on one side and a smooth flexible curved surface to hold the display material against the tabs. The closure acts perpendicularly to the display material with a snap together closure that does not come in contact with the display material.

10 Claims, 2 Drawing Sheets

DUAL EXTRUSION SNAP CLOSED CEILING SIGN HANGER

This application is a continuation of 09/840,572 filed Apr. 23, 2001, now U.S. Pat. No. 6,605,928 and is a continuation of 09/319,390 now abandoned which is a 371 of PCT/US97/22405 filed Dec. 3, 1997 which claims benefit of Provisional Application 60/032,149 filed Dec. 3, 1996.

BACKGROUND OF THE INVENTION

1. Field of the Invention

The present invention relates to sign hangers and in particular to a dual extrusion sign hanger which hangs from the ceiling and holds signs, banners, posters, and any other sheet type of display material which can be easily changed within a smooth non-damaging holder portion openable for free non-friction insertion of the display material and acting perpendicularly to the display material with a snap together closure out of contact with the display material.

2. Description of the Prior Art

In commercial spaces, exhibition halls, trade show spaces, entertainment venues, and at many other locations, including at home, it is often desired to hang displays of varying kinds which are generally on sheets of paper, cloth, plastic, or other two-dimensional display media. Wall space is often at a premium and in large spaces the walls are too far away from the desired display location. Being able to hang information from the ceiling is a highly efficient and highly visible way to make use of normally unused ceiling space and gain maximum exposure.

While there have been many prior art attempts to solve this display problem many of them are difficult to operate whenever it is desired to insert or remove the display and some are overly complex or might even damage the display material in trying to insert and remove it.

Prior art U.S. Pat. No. 4,564,165, issued Jan. 14, 1986 to Grant, shows a device that is provided for attaching a depending unit (e.g., a poster) to a ceiling wherein the latter includes a support having an exposed flange. The depending unit has a thin upper peripheral segment with means for adjustment from a first mode to a second mode. The device has an elongated member provided with an elongated interior cavity accessible through an elongated narrow opening formed in the exposed surface thereof. The opening is sized to permit the unit upper peripheral segment to pass therethrough only when the means is in the first mode. When the unit upper peripheral segment is disposed within the cavity of the elongated member, the means assumes a second mode whereby the elongated member and said unit are retained in attached relation. The device is provided with an element which engages a concealed surface portion of the elongated member and coacts with the exposed flange of the ceiling support and secures the elongated member thereto.

Prior art U.S. Pat. No. 4,840,341, issued Jun. 20, 1989 to Hasegawa, depicts a clip assembly having a pair of cooperative pivotally interconnected clip members with integral spring means biasing the clip members to article-grasping position and a releaseable latch on one member operative to engage a catch on the other member for holding the members in open position to facilitate entry of articles between the article-grasping jaws of the clip members, the clip assembly being slidably mounted on a support for movement to laterally adjusted positions. The spring means is also operative to deflect one of the clip members to hold it tightly in interlocking engagement with the support.

Prior art U.S. Pat. No. 4,899,974, issued Feb. 13, 1990 to Wear, provides an extruded self-gripping clip poster hanger device consisting of an elongated body portion having a rail or track formed in its upper end portion and having an apertured ear or holder slidable in the rail, the body portion having a flat rear wall and a front wall arcuate in vertical cross section having a bottom lip in gripping engagement with the adjacent facing portion of the rear wall, the bottom lip and facing portion having engaging longitudinal ribs.

Prior art U.S. Pat. No. 4,991,268, issued Feb. 12, 1991 to Ho, describes an improved memo clip and in particular to one utilizing a saw teeth plate and a pressing plate to clip paper and grasp the paper firmly by means of a spring. When desired to pull one piece of paper out, it is simply by pulling the piece of paper out either from left or right hand side and paper will easily be pulled out without bothering other paper.

Prior art U.S. Pat. No. 5,275,367, issued Jan. 4, 1994 to Frye, discloses a reusable self securing plastic holding device for mounting onto a smooth clean polished surface and having a particular physical arrangement which absorbs and dissipates the sheer forces exerted thereupon by a held object.

Prior art U.S. Pat. No. 5,584,461, issued Dec. 17, 1996 to Pynenburg, puts forth an improved panel holder for hanging posters and other sheet material and which can be either wall mounted or suspended from a ceiling. The holder includes two longitudinal extruded panels each having a longitudinal C-shaped flange situated along one of the panel edges. One flange is inserted within the other one to form a longitudinal interlocking hinge connection. The panels are movable with respect to each other in a transverse direction about this hinge coupling between an open and a closed position. The flanges are dimensioned in such a way that rotation of the panels with respect to one another in the transverse direction results in one of the flanges being elastically deformed during the first part of the motion, with the resulting stored elastic energy being abruptly released during the second part of the panel motion, thereby giving rise to the holder snapping open or closed. In the fully open position the holder forms a well defined receiving mouth for inserting or removing a sheet material such as a poster thus eliminating the problem of the poster being pinched and possibly damaged as is encountered in previous designs. The poster holder formed by the interlocked panels eliminates the need for separate elements for hinging the panels together and biasing the panels open and closed.

Prior art U.S. Pat. No. 5,682,650, issued Nov. 4, 1997 to Noguchi, claims a sheet clipping device which is designed to detachably hold one or more sheets. The sheet clipping device is formed of an elongated base member, and a plurality of gripping devices fixed to the elongated base member at a predetermined distance away from each other along the longitudinal direction thereof. The elongated base member is formed of upper and lower portions with diagonal upper and lower guide members, and a back portion situated between the upper and lower portions. Distal ends of the upper and lower guide members are vertically spaced apart from each other. Each gripping device includes an upper frictional member fixed to the upper portion, and a lower frictional member fixed to the lower portion to face to each other. When the sheets are inserted between the upper and lower frictional members through the guide members, the sheets are frictionally retained between the frictional members. The sheets can be easily attached to or removed from the clipping device.

Prior art U.S. Pat. No. 5,718,402, issued Feb. 17, 1998 to Hoffman, concerns an elongated extruded plastic clip having a planar base portion joined to a planar leg in a parallel spaced apart manner. The leg and base are connected by a bridging portion. The leg has an elongated distal edge to which a curved clamp is attached. The clamp is secured to the leg by a flexible hinge. The clamp extends beyond the distal edge of the base to permit easy manual opening of the clamp and articulation thereof with respect to the base.

Prior art U.S. Pat. No. 6,018,850, issued Feb. 1, 2000 to Lorber, indicates a clip for paper sheets, which is injection molded in one piece from plastic. The clip is cross-sectionally U-shaped, the two legs interconnected by a web being flat and their flat sides face one another. In the gap formed in this way between the two legs is placed a clamping leg, which is connected in one piece to the inside of one leg and from there is inclined in the direction of the other leg and in the direction of the web. The paper sheets are slid into the gap, it being possible for the clamping leg to deform, whilst making difficult a drawing out of the sheets.

What is needed is a relatively simple and inexpensive means to hang ceiling displays which is easy to use and does not damage the display material.

SUMMARY OF THE INVENTION

An object of the present invention is to provide a ceiling hanger for two-dimensional display material which has an easy-to-use snap-together closure for receiving and releasing the display material.

Another object of the present invention is to provide an easy-to-use holder for two-dimensional display material which has a smooth curved holder surface which presses against soft prongs to sandwich the display material without damaging it.

A related object of the present invention is to provide a hinged means for moving the smooth curved holder surface perpendicular to the display material to receive the material for holding it and for releasing the material coming completely away from the display material so that the display material does not require insertion or removal with friction contact, but is merely placed freely into the holder against soft tabs and the smooth curved holder surface contacts the material from a perpendicular direction with no friction and smoothly presses the material against the soft tabs, wherein the snap portion which holds the smooth curved holder surface in place is away from the display material and does not contact or damage the display material.

One more object of the present invention is to provide a display hanger which is easy and inexpensive to manufacture of extruded plastic in a dual extrusion.

A further object of the present invention is to cut overhead costs by not having to replace display material.

In brief, a dual extrusion hanger for signs, banners, posters or other printed graphics that easily snaps open and closed to change the signs which are held by the hanger. There is a slot at the top of the first extrusion piece made for holding a T section to hang the profile from the ceilings. The second extrusion piece, which is a curved inverted V-shaped piece, is attached to the first extrusion piece which is an inverted square U shape. The second extrusion piece is connected by a flexible hinge on the interior of the point of the V to an end tip of a leg of the inverted square U-shaped piece where the V-shaped piece straddles the end of the leg of the inverted square U-shaped piece. An upwardly angled ridge latches with a snap fit into a downwardly angled ridge of the U and thereby causing a smooth convexly curved holding surface on the left leg of the V to hold the graphic material against soft protruding tabs on the interior of the other leg of the U-shaped piece, without the snap fit closure means contacting the display material. The two snap-fit ridges can be unlatched by using a fingernail or any coin on a control tab protruding from the upwardly angled ridge of the V-shaped piece.

Retailers use thousands of hanging banners to direct, attract, instruct and inform shoppers. The object of the device is to make it easy to hang up signs or display materials, easily changing the graphics as is required by the seasons, sales or periodic reorganization of floor plans.

An advantage of this invention is having means to hold two-dimensional display material without creating damage to the material, by having a snap closure that does not contact the display material.

Another advantage of this invention is in cutting the overhead cost of replacing display materials.

An additional advantage of this invention is in providing a display hanger which is easy and inexpensive to manufacture.

One more advantage of this invention is to provide a ceiling hanger for two-dimensional display material that has an easy to use snap-together closure for receiving and releasing the display material.

Yet another advantage of this invention is to provide a display hanger which is easy to install.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
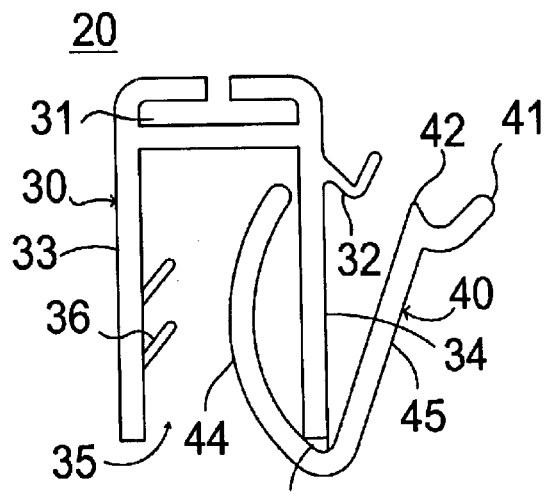
FIG. 1 is an end elevational view of the hanger of the present invention showing the smooth curved holder portion of the hanger in the open position ready to receive a display material insertable therein.
Figure 2:
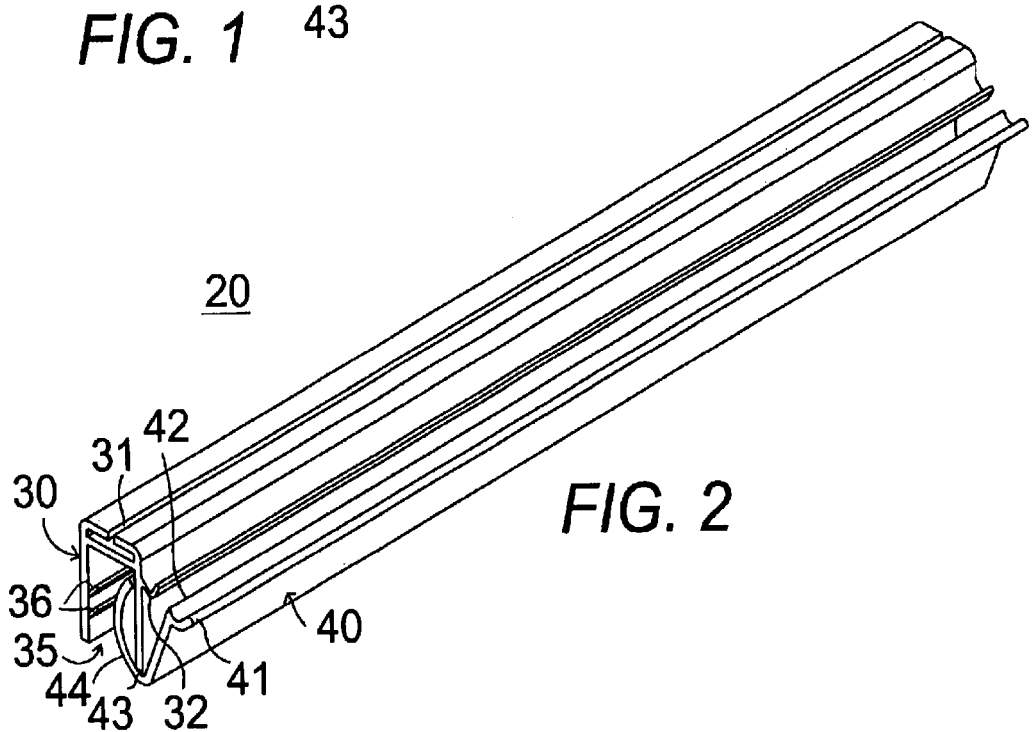
FIG. 2 is a perspective view of the hanger of FIG. 1 in the open position.
Figure 3:
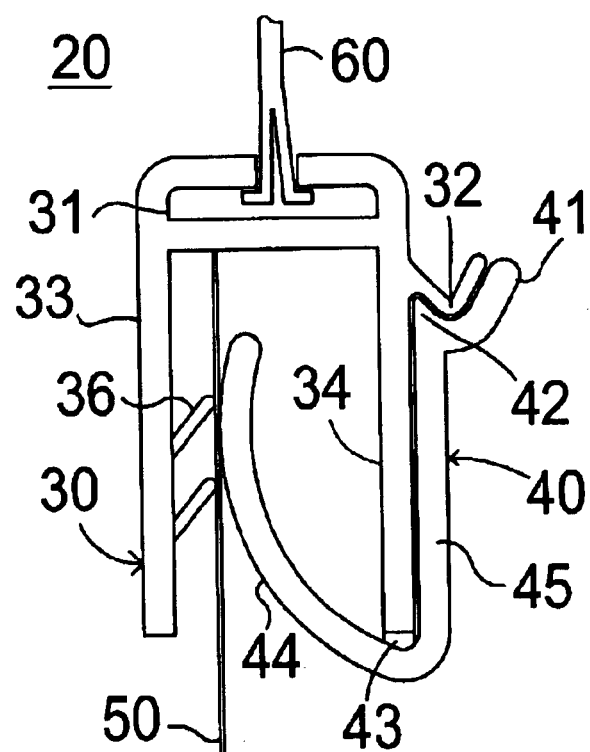
FIG. 3 is an end elevational view of the hanger of FIG. 1 showing a two-dimensional display material inserted and held by the smooth curved holder portion against the soft tabs on the other side of the display material within the snap together closure of the holder portion in the closed position.

In FIGS. 1–3, a hanger device 20 for sheet display material 50 has non-damaging easy opening and closing capability. The hanger device 20 comprises a first extrusion piece 30 and a second extrusion piece 40 pivotally interconnected by a hinge means, such as a living hinge 43.

The first extrusion piece 30 has a mounting means 31 which is formed by two angled tabs extending from the top portion of the first extrusion piece 30 forming a T-shaped slot 31 along the top portion of the first extrusion piece 30, the T-shaped slot 31 being capable of receiving T-shaped hangers 60 with the ends compressed together and fit into the slot with a tension fit as seen in FIG. 3. The first extrusion 30 piece also has a downwardly facing U shaped channel which has a M opening 35 capable of freely receiving at least one piece of sheet material 50, the opening 35 has a first vertically oriented leg 34 and a second vertically oriented leg 33 which second leg has at least one flexible, angled tab 36, preferably two or more, protruding inwardly and upwardly from the interior of the second leg 33 along the length of the hanger device 20. The full length of the first extrusion piece 30 has a downwardly angled ridge 32 positioned to face outwardly on the first leg 34 of the U-shaped channel, for the purpose of engaging an upwardly protruding ridge 42 from the second piece 40 which engages the downwardly angled ridge 32 with a snap together fit forming a snap closure means.

The second extrusion piece 40 is an upwardly oriented V shaped channel pivotally mounted to the first extrusion piece 30 by a living hinge 43, at an end of the first leg 34 of the U-shaped channel, which would then be adjacent to the interior point of the V of the V-shaped channel. The second extrusion piece 40 has a smooth holder surface 44 which comprises a first leg of the V shaped channel and is formed in a smooth curve and positioned within the opening 35 of the U-shaped channel. The smooth holder surface 44 faces the at least one flexible tab 36. The holder surface 44 is capable of moving from a first position (as shown in FIG. 1) spaced apart from the at least one flexible tab 36 a sufficient distance to admit the sheet material 50 freely, to a second position (as shown in FIG. 3) pressing against the at least one flexible tab 36 to retain the at sheet display material 50 sandwiched in between. The full length of the second extrusion piece 40 has a snap closure means comprising the upwardly angled ridge 42 on the second leg of the V-shaped channel 45 for engaging the flexible downwardly angled ridge 32 of the first extrusion piece 30, and a holding tab 41 which is pulled outwardly to release the snap closure means. The snap closure means is spaced apart from the holder surface 44, so that the second extrusion piece 40 is capable of being pivoted toward the first extrusion piece 30 to engage the snap closure means, maintaining the holder piece 44 in the second position (as shown in FIG. 3) to retain the sheet material 50. The second extrusion piece 40 is further capable of being pivoted away from the first extrusion piece 30 to disengage the snap closure means and move the holder surface 44 to the first position (as shown in FIG. 1) to release the sheet material 50.

Preferably the hanger device 20 is fabricated easily and inexpensively of extruded plastic in a dual extrusion.

In practice the hanger device 20 is suspended from the ceiling by mounting a T-shape hanger 60 to the ceiling, then the T-shaped hanger 60 slides into the T-shaped slot 31 that is in the top of the first extrusion piece 30. To engage the holding device 20, you would place a piece of display material 50 in between the smooth holder surface 44 and the at least one flexible tab 36, then press the holding tab 41 thus moving the upwardly angled ridge 42 towards the downwardly angled ridge 32 until they snap together. To remove the display material 50, the holding tab 41 is pulled outwardly and downwardly until the downwardly angled ridge 32 and the upwardly angled ridge 42 disengage, allowing the display material 50 to pull out freely.

It is understood that the preceding description is given merely by way of illustration and not in limitation of the invention and that various modifications may be made thereto without departing from the spirit of the invention as claimed.

What is claimed is:

1. A hanger device for sheet display material with non-damaging easy opening and closing capability, the hanger device comprising:
    a first extrusion piece having a mounting means and having a downwardly facing space adapted for receiving at least one piece of sheet material freely insertable therein, the space having a vertically oriented surface having at least one flexible tab protruding from the vertically oriented surface;
    a second extrusion piece pivotally mounted to the first extrusion piece by a hinge means, the second extrusion piece having a smooth holder surface facing the at least one flexible tab, the holder surface adapted for moving from a first position spaced apart from the flexible tab a sufficient distance to admit the sheet material with a non-contact insertion therebetween to a second position pressing against the at least one flexible tab to retain the at least one piece of sheet material sandwiched therebetween, the second extrusion piece further comprising a snap closure means for engaging the first extrusion piece, the snap closure means spaced apart from the holder surface, so that the second extrusion piece is adapted for being pivoted toward the first extrusion piece to engage the snap closure means to maintain the holder surface in the second position to retain the sheet material and further adapted for being pivoted away from the first extrusion piece to disengage the snap closure means and move the holder surface to the first position to release the sheet material;
    wherein the snap closure means comprises a flexible downwardly angled ridge of the first extrusion piece adapted for receiving an upwardly angled ridge of the second extrusion piece with a snap fit therebetween.

2. The hanger device of claim 1 wherein the first extrusion piece comprises a downwardly oriented square U-shaped channel and the second extrusion piece comprises an upwardly oriented V-shaped channel attached to the first extrusion piece by a living hinge at an end of a first leg of the U-shaped channel attached to the interior point of the V of the V-shaped channel.

3. The hanger device of claim 2 wherein the at least one flexible tab protrudes inwardly from a second leg of the U-shaped channel and the smooth holder surface comprises a first leg of the V-shaped channel formed in a smooth curve and positioned within the U-shaped channel facing the at least one flexible tab.

4. The hanger device of claim 1 wherein the at least one flexible tab comprises two flexible tabs angled upwardly protruding from the vertically oriented surface along the length of the hanger device.

5. The hanger device of claim 4 wherein the hanger surface comprises a smooth curved surface adapted for contacting the flexible tabs along the length of the hanger device in the second position.

6. The hanger device of claim 1 wherein the mounting means comprises a means for receiving a hanger built into a top portion of the first extrusion piece.

7. The hanger device of claim 6 wherein the means for receiving a hanger comprises two angled tabs extending from the top portion of the first extrusion piece forming a T-shaped slot along the top portion of the first extrusion piece, the T-shaped slot adapted for receiving T-shaped hangers insertable therein.

8. The hanger device of claim 1 wherein the first extrusion piece and the second extrusion piece are fabricated of extruded plastic in a dual extrusion.

9. A hanger device for sheet display material with non-damaging easy opening and closing capability, the hanger device comprising:
    a first extrusion piece having a mounting means and having a downwardly facing space adapted for receiving at least one piece of sheet material freely insertable therein, the space having a vertically oriented surface having at least one flexible tab protruding from the vertically oriented surface;

a second extrusion piece pivotally mounted to the first extrusion piece by a hinge means, the second extrusion piece having a smooth holder surface facing the at least one flexible tab, the holder surface adapted for moving from a first position spaced apart from the flexible tab a sufficient distance to admit the sheet material with a non-contact insertion therebetween to a second position pressing against the at least one flexible tab to retain the at least one piece of sheet material sandwiched therebetween, the second extrusion piece further comprising a snap closure means for engaging the first extrusion piece, the snap closure means spaced apart from the holder surface, so that the second extrusion piece is adapted for being pivoted toward the first extrusion piece to engage the snap closure means to maintain the holder surface in the second position to retain the sheet material and further adapted for being pivoted away from the first extrusion piece to disengage the snag closure means and move the holder surface to the first position to release the sheet material;

wherein the first extrusion piece comprises a downwardly oriented square U-shaped channel and the second extrusion piece comprises an upwardly oriented V-shaped channel attached to the first extrusion piece by a living hinge at an end of a first leg of the U-shaped channel attached to the interior point of the V of the V-shaped channel;

wherein the at least one flexible tab protrudes inwardly from a second leg of the U-shaped channel and the smooth holder surface comprises a first leg of the V-shaped channel formed in a smooth curve and positioned within the U-shaped channel facing the at least one flexible tab;

wherein the snap closure means comprises a flexible downwardly angled ridge facing outwardly on the first leg of the U-shaped channel of the first extrusion piece adapted for receiving an upwardly angled ridge on a second leg of the V-shaped channel of the second extrusion piece positioned out side of the U-shaped channel with a snap fit therebetween.

10. The hanger device of claim 9 wherein the snap closure means comprises a flexible downwardly angled ridge of the first extrusion piece adapted for receiving an upwardly angled ridge of the second extrusion piece with a snap fit therebetween.

* * * * *